(12) United States Patent
Jeske et al.

(10) Patent No.: US 8,431,186 B2
(45) Date of Patent: Apr. 30, 2013

(54) METHOD FOR THE COATING OF A DIESEL PARTICLE FILTER AND DIESEL PARTICLE FILTER PRODUCED THEREBY

(75) Inventors: Gerald Jeske, Neuberg (DE); Marcus Pfeifer, Solingen (DE); Wolfgang Schneider, Rodenbach (DE); Franz Dornhaus, Frankfurt am Main (DE); Ralf Mueller, Sinntal (DE); Michael Schiffer, Langenselbold (DE)

(73) Assignee: Umicore AG & Co. KG, Hanau-Wolfgang (DE)

( * ) Notice: Subject to any disclaimer, the term of this patent is extended or adjusted under 35 U.S.C. 154(b) by 241 days.

(21) Appl. No.: 12/866,982

(22) PCT Filed: Feb. 17, 2009

(86) PCT No.: PCT/EP2009/051850
§ 371 (c)(1),
(2), (4) Date: Aug. 10, 2010

(87) PCT Pub. No.: WO2009/103699
PCT Pub. Date: Aug. 27, 2009

(65) Prior Publication Data
US 2010/0319332 A1 Dec. 23, 2010

(30) Foreign Application Priority Data
Feb. 21, 2008 (DE) .......................... 10 2008 010 388

(51) Int. Cl.
*B05D 7/22* (2006.01)
*B01J 29/04* (2006.01)
*B01J 29/06* (2006.01)

(52) U.S. Cl.
USPC ........... 427/231; 427/230; 427/235; 427/238; 502/60; 502/66

(58) Field of Classification Search .................. None
See application file for complete search history.

(56) References Cited

U.S. PATENT DOCUMENTS

| 2001/0026838 A1 | 10/2001 | Dettling et al. | |
|---|---|---|---|
| 2003/0044520 A1* | 3/2003 | Kiessling et al. ............... | 427/79 |

(Continued)

FOREIGN PATENT DOCUMENTS

| DE | 10 2004 020 259 | 11/2005 |
|---|---|---|
| DE | 10 2004 040 549 | 2/2006 |

(Continued)

OTHER PUBLICATIONS

PCT Notification of Transmittal of Translation of the International Preliminary Examination Report (Form PCT/IB/338) mailed Sep. 16, 2010 for Application No. PCT/EP2009/051850.

(Continued)

*Primary Examiner* — Melvin C Mayes
*Assistant Examiner* — Sheng H Davis
(74) *Attorney, Agent, or Firm* — Smith, Gambrell & Russell, LLP

(57) ABSTRACT

To equip a diesel particle filter with a zeolite-containing coating uniformly over the entire length of the particle filter and with a further zeolite-free coating which is applied, from the entry side of the filter, solely up to a specific length of the filter, it is proposed, first, to apply the zeolite-free coating from the entry side of the filter and only thereafter to apply the zeolite-containing coating over the entire length of the filter from the exit side of the filter. As a result of this sequence of coatings, a better adhesive strength of the coatings than when both coatings are applied from the entry side is ensured.

17 Claims, 1 Drawing Sheet

U.S. PATENT DOCUMENTS

| | | | |
|---|---|---|---|
| 2006/0057046 A1* | 3/2006 | Punke et al. | 423/215.5 |
| 2007/0116870 A1* | 5/2007 | Dettling et al. | 427/230 |
| 2008/0107806 A1 | 5/2008 | Mergner et al. | |
| 2008/0227627 A1* | 9/2008 | Strehlau et al. | 502/61 |
| 2009/0137386 A1* | 5/2009 | Pfeifer et al. | 502/262 |

FOREIGN PATENT DOCUMENTS

| | | |
|---|---|---|
| DE | 10 2004 040 550 | 2/2006 |
| DE | 10 2004 040 551 | 2/2006 |
| EP | 1 721 665 | 11/2006 |

OTHER PUBLICATIONS

PCT International Preliminary Report on Patentability (Form PCT/IB/373) issued Sep. 7, 2010 for Application No. PCT/EP2009/051850.

English translation of the PCT Written Opinion of the International Searching Authority (Form/ISA/237) issued Sep. 7, 2010 for Application No. PCT/EP2009/051850.

International Search Report for PCT/EP2009/051850 mailed Jul. 15, 2009.

* cited by examiner

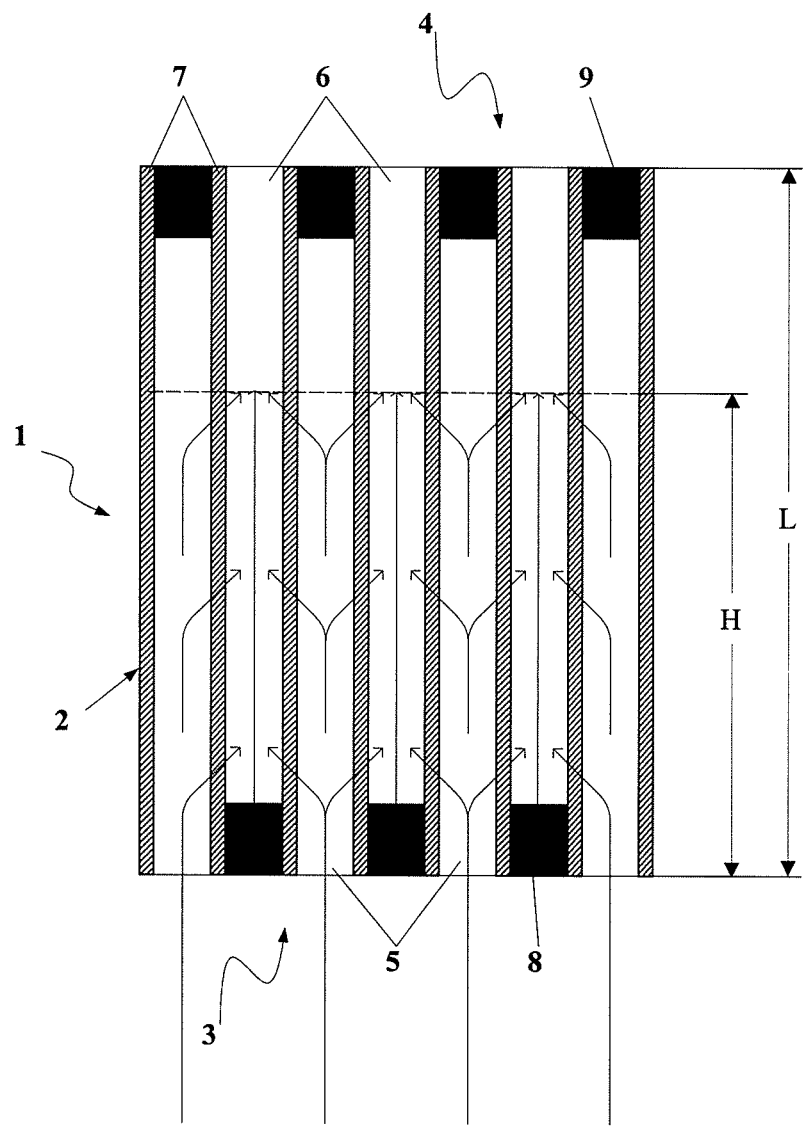

METHOD FOR THE COATING OF A DIESEL PARTICLE FILTER AND DIESEL PARTICLE FILTER PRODUCED THEREBY

The invention relates to a method for the coating of a diesel particle filter with a catalytically active coating for purifying the exhaust gases of diesel engines, a zeolite-containing layer being applied uniformly over the entire length of the particle filter, and a further, zeolite-free layer being applied solely in an entry zone for increasing the noble metal concentration in this zone.

Particle filters are capable of filtering particulate exhaust gas constituents, especially soot particles, out of the exhaust gas of internal combustion engines and are thus preventing them from being emitted into the atmosphere. The present invention is concerned particularly with the use of what are known as wall flow filters for this purpose. Wall flow filters usually consist of ceramic materials, such as, for example, silicon carbide, cordierite, aluminum titanate or mullite. Degrees of filtration of more than 95% are achieved by means of these filters.

Wall flow filters, as a rule, possess a cylindrical shape with two end faces and with a surface area and are penetrated from the first end face to the second end face by a multiplicity of flow ducts, lying essentially parallel to a cylinder axis, for the exhaust gases of the diesel engines. The cross-sectional shape of wall flow filters depends on the installation requirements on the motor vehicle. Filter bodies with a round cross section or with an elliptic or triangular cross section are in widespread use. The flow ducts mostly have a square or hexagonal cross section and are arranged in a close grid pattern over the entire cross section of the filter bodies. Depending on the application, the duct or cell density of the flow ducts varies between 10 and 140 $cm^{-2}$. The thickness of the duct walls between two adjacent flow ducts typically amounts to 0.1 to 0.3 mm, depending on the cell density.

To generate the filter action, the flow ducts are closed alternately on the first and on the second end face. According to the arrangement of the filter in the exhaust gas stream of the diesel engine, one end face forms the inlet end face and the second end forms the outlet end face for the exhaust gas. The flow ducts open on the inlet side form the inlet ducts and the flow ducts open on the outlet side form the outlet ducts. Inlet and outlet ducts are alternately adjacent and are separated from one another by the duct walls between them.

On its way through the filter, the exhaust gas has to change over from the inlet ducts, through the duct walls between the inlet and outlet ducts, into the outlet ducts of the filter. For this purpose, the material from which the wall flow filters are constructed has an open-pored porosity. Wall flow filters are preferably used, the porosity of which lies between 30 and 95% and the pores of which have mean diameters of between 10 and 50 µm. The porosity preferably amounts to between 45 and 90%. By contrast, the porosity of conventional ceramic throughflow honeycomb bodies, at about 30%, lies at the lower end of the porosity range of wall flow filters. The difference is even clearer in the case of the mean pore diameter which, in conventional throughflow honeycomb bodies, lies only at about 4 to 5 µm.

However, the actual challenge in operating a particle filter in the exhaust gas of an internal combustion engine is not the filtration of the soot particles, but the periodic regeneration of the filters used. Since the temperatures of more than 550° C. which are required for the ignition and combustion of the soot with oxygen can usually be reached in modern passenger car diesel engines only when these are being operated under full load, additional measures for oxidizing the filtered soot particles are absolutely necessary in order to prevent a clogging of the filter by soot. For this purpose, the filter may be coated with a catalyst layer which is capable of lowering the soot ignition temperature.

Since the lowering of the soot ignition temperature by means of catalytic measures is generally not sufficient to ensure a complete regeneration of the filter in all the operating states of the engine, in present-day practice a combination of passive and active measures is usually resorted to. The combination of the particle filter with an oxidizing catalytic converter arranged upstream has proved especially appropriate. By a postinjection of additional fuel in combination with other engine measures (such as, for example, throttling), unburnt fuel and carbon monoxide pass onto the diesel oxidizing catalytic converter and are converted catalytically there into carbon dioxide and water. As a result of the reaction heat which is in this case released, the exhaust gas and consequently also the following particle filter are heated. In combination with the lowering of the soot ignition temperature by means of a catalytic coating of the filter or else by the use of fuel additives, the postinjection quantity required can be reduced and the filter can be regenerated virtually at any operating point in the characteristic map of the engine.

In new exhaust gas aftertreatment systems, the filters are installed as near as possible behind the engine, in order to ensure a rapid heating of the filters. On account of the restricted construction space and to reduce the costs, the oxidizing catalytic converter is in these cases applied partially or completely to the filter. The oxidizing catalytic converter on the filter must have the required running performance for a correspondingly high oxidizing potential in order to adhere to the statutorily predetermined limit values for carbon monoxide (CO) and hydrocarbons (HC). In addition, it must additionally be capable, over the entire running time, of converting the hydrocarbons which are postinjected during active filter regeneration, in order thereby to generate the exothermy necessary for achieving the soot ignition temperature. Furthermore, the catalytically active coating must have high thermal stability for such a filter to be used near the engine.

Hitherto, filter coatings with platinum have been employed virtually exclusively for diesel passenger cars. Coatings with platinum and palladium have likewise become known (see the applicant's DE 10 2004 040 549 A1). Coatings with platinum and palladium are distinguished by very good temperature stability, but have lower fresh activity than catalytic coatings with platinum. Platinum- and palladium-containing coatings have already been described, in principle, for some time.

According to the applicant's DE 10 2004 040 549 A 1, for coating the wall flow filters with a catalyst, coating suspensions may be used which contain catalytically active noble metals on high-surface solid carrier materials. In order to minimize the exhaust gas backpressure due to the coating, it is recommended to introduce the catalyst layers into the pores of the duct walls of the wall flow filters. For this purpose, according to DE 10 2004 040 549 A1, the coating suspensions are subjected, before coating, to special grinding. Grinding is in this case carried out so that the maximum size of the carrier particles in the suspension is lower than 10 µm. This is fulfilled to a sufficient extent when the mean particle size $d_{50}$ is reduced to below 2 µm as a result of grinding. According to experience, the corresponding $d_{90}$ diameter then lies below 5 µm. The designation $d_{50}$ ($d_{90}$) means, here, that the volume of the particles with particle sizes of below $d_{50}$ ($d_{90}$) adds up to 50% (90%) of the volume of all the particles. This low particle size ensures that the carrier materials are deposited almost exclusively in the pores of the filter material. Further methods for the coating of wall flow filters are described in the applicant's patent applications DE 10 2004 040 551 A1 and DE 10 2004 040 550 A1.

The inventors attempted to combine the platinum/palladium coatings described in DE 10 2004 040 549 A1 with a zeolite-containing coating for improving the storability for hydrocarbons, in order to store the unburnt hydrocarbons from the diesel fuel which are emitted during operating phases of a diesel engine with low exhaust gas temperatures and to desorb them again at higher exhaust gas temperatures and convert them on the catalytically active noble metals of the remaining catalyst coating. For this purpose, first, the zeolite-containing catalyst layer was applied over the entire length of the wall flow filter, from the inlet side of the wall flow filters, according to the methods described in the patent applications DE 10 2004 040 551 A1 and DE 10 2004 040 550 A1. The fine grinding of the solids in the coating suspension ensured that the catalyst material was included essentially into the pores of the wall flow filter. Subsequently, a platinum/palladium catalyst was introduced, from the inlet side of the wall flow filter, into the pores over only a specific fraction of the length of the filter, in order to increase the catalytic activity of the filter in the entry region.

Unfortunately, in shock tests, it was shown that small quantities of the catalytic coating came loose from the filter. Breakaways occurred particularly in the case of the loading of the filter with zeolites in concentrations of more than 10 g/l of filter volume. The object of the present invention, therefore, is to specify a method for the coating of a diesel particle filter with a catalytically active coating for purifying the exhaust gases of diesel engines, a zeolite-containing layer being applied uniformly over the entire length of the particle filter, and a further, zeolite-free layer being applied solely in an entry zone in order to increase the noble metal concentration in this zone. The method is intended to afford an improved adhesive strength of the coating especially in the case of high coating concentrations.

This object is achieved by means of a method for the coating of a diesel particle filter with a catalytically active coating, a zeolite-containing layer being introduced uniformly over the entire length of the particle filter, and a further, zeolite-free noble metal catalyst being introduced into the pores of the filter material solely in an entry zone in order to increase a noble metal concentration in this zone. The diesel particle filter is in the form of a cylindrical wall flow filter with a cylinder axis, which filter has an inlet end face, an outlet end face and a length L of the filter body.

The method is distinguished essentially by a change in the coating sequence and in the coating direction. It was found that coating breakaways during shock tests can be largely avoided if the noble metal catalyst is first introduced into the pores of the filter from the entry side of the filter up to a desired fraction of the overall length of the filter. The zeolite-containing coating is then likewise introduced into the pores of the filter material from the exit side of the filter over the entire length of the filter.

In particular, the method comprises the following method steps:
a) vertical orientation of the axis of the filter body, with the inlet end face downward,
b) pumping of a first, zeolite-free coating suspension through the inlet end face up to a predetermined height H, and suction extraction of the coating suspension downward,
c) rotation of the filter body about an axis perpendicular to the cylinder axis through 180°,
d) pumping of a second, zeolite-containing coating suspension through the then lower outlet end face into the filter substrate as far as the upper inlet end face, and suction extraction or pumping out of the coating suspension downward, and
e) drying and calcining of the coating, both coating suspensions being ground, before coating, so finely that the particles of the solids have a diameter $d_{90}$ lower than 5 μm and a solid content of less than 25% by weight.

The wall flow filter to be coated by means of the method consists preferably of a ceramic material such as, for example, silicon carbide, cordierite, aluminum titanate or mullite, with an open-pored structure, with a porosity of between 40 and 80% and with a mean pore diameter of between 9 and 30 μm.

By means of the coating method, the catalyst materials contained in the coating suspensions are to be introduced into the pores of the duct walls of the wall flow filter. For this purpose, the solid catalyst materials suspended in the coating suspensions are comminuted by grinding, before coating, to an extent such that the particles of the solids have a diameter $d_{90}$ lower than 5 μm. Moreover, the concentration of the catalyst materials in the coating suspensions is limited to a maximum of 25% by weight in relation to the overall weight of a coating suspension. By virtue of this measure, the coating suspensions have relatively low viscosity, so that, when being pumped into the filter substrates from below through the open pores of the duct walls, they can flow over from the inlet ducts into the outlet ducts. The coating suspension therefore simultaneously rises in height in the inlet and outlet ducts. When the desired coating height is reached, the coating suspension is pumped or sucked out of the filter substrate downward again. In this case, the catalyst materials are deposited in the pores of the duct walls. The low solid concentration of the coating suspensions largely prevents the situation where accesses to the pores in the duct walls are blocked by the solid particles and a coating lying on the duct walls is formed.

The first, zeolite-free coating suspension is applied, from the entry side of the filter, over a length H of the filter which may amount to 5 to 80% of the overall length L of the filter substrate, preferably 10 to 50%. It contains at least one or more platinum group metals, preferably a combination of platinum and palladium with a weight ratio of platinum to palladium of 1:10 to 20:1, preferably of 1:1 to 10:1, in particular of 2:1. Suitable carrier materials for the platinum group metals are aluminum oxide, silicon dioxide, titanium dioxide, zirconium oxide, cerium oxide and mixtures or mixed oxides thereof, but no zeolites are used as carriers. The concentration of the platinum group metals on the carrier materials preferably lies between 1 and 20, preferably between 5 and 15% by weight in relation to the overall weight of the carrier materials and platinum group metals. Good results are achieved with a concentration of the platinum group metals on these carrier materials of 10% by weight. In the finished wall flow filter, the loading quantity of this first coating should be selected so that the concentration of the platinum group metals in relation to the volume of the wall flow filter lies between 0.5 and 5, preferably between 1 and 3 g/l.

The carrier materials can be stabilized thermally by doping with rare earth oxides, alkaline earth oxides or silicon dioxide. Thus, for example, in the case of aluminum oxide, the transformation temperature from γ-aluminum oxide to α-aluminum oxide is increased from approximately 950 to 1100° C. by doping with barium oxide, lanthanum oxide or silicon dioxide. The concentration of the doping elements, calculated as oxide and in relation to the overall weight of the stabilized aluminum oxide, in this case amounts usually to 1 to 40% by weight. When cerium oxide is used as carrier material, it is advantageous to employ cerium/zirconium mixed oxides, since these, as a rule, possess a higher temperature stability than pure cerium oxide. The stability of the cerium/zirconium mixed oxides can be further improved by doping with praseodymium oxide or neodymium oxide. Furthermore, cerium/zirconium mixed oxides also have advantageous oxygen storage properties both as regards the maximum oxygen storage capacity and as regards the kinetics of oxygen storage and release.

The second coating suspension contains zeolites. Preferably, the zeolites are selected from the group consisting of mordenite, silicalite, Y-zeolite, ZSM-5 zeolite and beta zeolite or mixtures thereof, the zeolites having a mole ratio (modulus) of silicon dioxide to aluminum oxide of between 10 and 400. According to experience, zeolites with a modulus of above 10 are sufficiently stable with respect to the acid components of the exhaust gas and to the maximum exhaust gas temperatures. During operating phases of the engine with a low exhaust gas temperature of below approximately 200° C., the zeolites store the hydrocarbons contained in the exhaust gas. This is important, since, at these low exhaust gas temperatures, oxidation of the hydrocarbons at the active noble metal centers of the catalyst is not possible. Such operating phases occur, in modern passenger car diesel engines, both during a cold start and during idling phases and also in town traffic. By contrast, at temperatures of above about 200° C., the desorption of the hydrocarbons predominates. However, at these higher catalyst temperatures, the hydrocarbons released from the storage components can be converted into carbon dioxide and water at the active centers of the catalyst.

In principle, the storage capacity for hydrocarbons increases with the rising quantity of zeolites. However, the maximum quantity of zeolites which can be used depends greatly on the porosity and the mean pore diameter of the wall flow filter used. Conventional zeolite loads range from 5 g/l (filter volume) in the case of low-porosity substrates (<50%) up to approximately 50 g/l in the case of substrates with higher porosity (>50%).

To increase the catalytic activity, the zeolites may additionally be activated catalytically by means of platinum group metals (platinum, palladium, rhodium, iridium) or transition metals (for example, iron, copper, cerium). For activation by means of platinum group metals, the zeolites may, for example, be impregnated with aqueous solutions of soluble precursor compounds. After impregnation, the zeolites are dried, calcined and, if appropriate, reduced.

The noble metal load on the zeolites preferably amounts to between 0.01 and 1% by weight in relation to the overall weight of zeolites and platinum group metals. Preferably, the platinum group metal used is platinum, if appropriate in combination with palladium.

When zeolites exchanged with transition metals (iron, copper and cerium) are used, the zeolites are doped in the ammonium or sodium form by ion exchange with the transition metals. Ion exchange may in this case be carried out either in solution or as what is known as solid-state ion exchange. The loading with transition metals preferably amounts to approximately 1 to 15% by weight in relation to the overall weight.

The second coating suspension may contain, in addition to the zeolites, a further catalyst material which may be identical to or else different from the catalyst material of the first coating suspension both in terms of the catalytically active noble metals and in terms of the carrier materials used. Preferably, for this purpose, a catalyst material with an identical composition to that in the first coating suspension is employed. The zeolites of the second coating suspension preferably have a weight ratio to the further catalyst material of 0.1 to 10.

It was shown that setting the particle diameters by grinding should preferably take place separately for catalyst materials and zeolites of the second coating suspension. Catalyst materials and zeolites have different hardnesses. Only by separate grinding can a comparable particle size distribution be guaranteed for both materials. Consequently, for coating the wall flow filter with the second coating suspension, preferably two separate suspensions are prepared first. The first suspension contains the carrier materials which are activated by means of noble metals (for example, platinum, palladium). The second suspension contains the zeolites. The zeolites are preferably doped with noble metal by impregnation or ion exchange in a preceding process step. However, noble metal may also be administered to the zeolite suspension with the aid of suitable precursor compounds. Where both suspensions are concerned, a mean particle diameter $d_{50}$ lower than 2 µm is then separately set by grinding; the $d_{90}$ value should lie at a maximum of 5 to 6 µm. Both suspensions are mixed and homogenized directly before the actual coating process.

The method described leads to a staged concentration of the catalytically active platinum group metals along the filter. More catalytically active platinum group metals are located in the front part of the filter in relation to the direction of flow of the exhaust gas. This is advantageous especially when diesel particle filters with an integrated oxidizing catalytic converter are arranged near the engine. To be precise, the silicon carbide filter substrates often employed possess a high thermal mass and have a sharp axial temperature gradient in the test cycles prescribed for certification, such as, for example, the NEDC (=New European Driving Cycle). Thus, especially when longer diesel particle filters (>150 mm) are used, the temperatures required for the conversion of carbon monoxide and hydrocarbons are usually not reached over the entire test cycle in the rear filter part arranged downstream. Consequently, in the case of a uniformly coated filter, part of the noble metal would contribute only little or even not at all to the conversion of carbon monoxide and hydrocarbons. For this reason, it is advantageous, especially in the case of filters arranged near the engine, to distribute the noble metals in a staged manner over the length of the particle filter, so that a zone with a higher noble metal load is present on the inflow side and a region with a lower noble metal load is present on the outflow side. The situation must be avoided, however, where a minimum noble metal concentration of approximately 0.1 g/l is undershot on the filter outlet side, since there is otherwise the risk, during active filter regenerations, of what are known as secondary emissions, that is to say eruptions of carbon monoxide and hydrocarbons.

The single figure serves for a further explanation of the method described. It shows diagrammatically a longitudinal section through a wall flow filter (1) in the coating position. The filter possesses a cylindrical shape with a length L, a surface area (2), with an inlet end face (3) and with an outlet end face (4). The filter has, over its cross section, flow ducts (5) and (6) for the exhaust gas which are separated from one another by the duct walls (7). The flow ducts are blocked alternately on the inlet and on the outlet end face by means of gastight plugs (8) and (9). The flow ducts (5) open on the inlet side form the inlet ducts and the flow ducts (6) open on the outlet side form the outlet ducts for the exhaust gas. The exhaust gas to be purified enters the inlet ducts of the filter and, in order to pass through the filter, must flow over from the inlet ducts through the porous duct walls (7) into the outlet ducts.

For coating the wall flow filter, the latter is oriented vertically with its cylinder axis, as shown in the figure, so that the inlet end face (3) of the filter comes to lie at the bottom. The first coating suspension is then pumped from below into the inlet ducts (5) to the height H. The arrows illustrate the flow of the suspension. On account of the high porosity of the filter material, of the low particle size of the solids of the suspension and of its low solid content, the coating suspension passes through the pores of the duct walls into the outlet ducts. The result of this is that the coating suspension, when being pumped into the inlet and outlet ducts, stands at an identical height and rises jointly. When the coating suspension has reached the desired height H in the filter body, the coating suspension is pumped out or sucked out downward again. As a result, the solids of the coating suspension are deposited essentially in the pores of the duct walls. Only very small fractions of the solids remain on the geometric surfaces of the duct walls. After the solids of the first coating suspension are deposited in the pores of the duct walls to a height H, the filter body is rotated through 180° about an axis perpendicular to the cylinder axis, so that the outlet end face (4) then comes to lie at the bottom. The second coating suspension is then pumped into the filter body from below again up to complete filling (H=L). After this second coating suspension has been pumped off, the filter body is dried and calcined.

The wall flow filter thus produced, even with a load of zeolites of more than 10 g/l, shows no layer breakaways during shock tests. Furthermore, these wall flow filters exhibit no disadvantages with regard to catalytic activity and exhaust gas backpressure, as compared with wall flow filters in which both coating suspensions have been introduced into the filter bodies solely from the inlet side.

The invention claimed is:

1. A method for coating a diesel particle filter with a catalytically active coating, wherein
    a zeolite-containing layer is introduced uniformly over the entire length of the particle filter, and a further, zeolite-free coating suspension of a noble metal catalyst is introduced into the pores of the filter material solely in an entry zone in order to increase a noble metal concentration in this zone, and the diesel particle filter being in the form of a cylindrical wall flow filter with a cylinder axis, which has an inlet end face, an outlet end face and a length L of the filter body,
    characterized in that the method comprises steps of,
    a) vertically orienting the axis of the filter body, with the inlet end face downward,
    b) pumping a first, zeolite-free coating suspension of a noble metal catalyst in through the inlet end face up to a predetermined height H, and suction extracting the coating suspension downward,
    c) rotating the filter body about an axis perpendicular to the cylinder axis through 180°,
    d) pumping a second, zeolite-containing coating suspension in through the then lower outlet end face into the filter substrate as far as the upper inlet end face, and suction extracting or pumping out the coating suspension downward, and
    e) drying and calcining the coating,
    wherein both coating suspensions are ground, before coating, so finely that the particles of the solids have a diameter $d_{90}$ lower than 5μm and a solid content of less than 25% by weight.

2. The method as claimed in claim 1, characterized in that the first, zeolite-free coating suspension contains carrier materials which are activated catalytically by means of platinum and palladium and which are selected from the group consisting of aluminum oxide, silicon dioxide, titanium dioxide, zirconium oxide, cerium oxide and mixtures or mixed oxides thereof.

3. The method as claimed in claim 2, characterized in that the second, zeolite-containing coating suspension contains catalytically activated zeolites which are selected from the group consisting of mordenite, silicalite, Y-zeolite, ZSM-5 zeolite and beta zeolite or mixtures thereof.

4. The method as claimed in claim 3, characterized in that the second coating suspension additionally contains carrier materials which are activated catalytically by means of platinum and palladium and which are selected from the group consisting of aluminum oxide, silicon dioxide, titanium dioxide, zirconium oxide, cerium oxide and mixtures or mixed oxides thereof, the zeolites being in a weight ratio of 0.1 to 10 to the other carrier materials.

5. The method as claimed in claim 4, characterized in that the zeolites are activated catalytically by means of at least one platinum group metal, the concentration of the platinum group metals amounting to between 0.01 and 1% by weight in relation to the overall weight of the zeolites.

6. The method as claimed in claim 5, characterized in that both coating suspensions contain as platinum group metals platinum and palladium in a weight ratio of between 1:10 and 20:1.

7. The method as claimed in claim 1, characterized in that the wall flow filter consists of ceramic material, the walls of which have an open-pored structure with a porosity of between 40 and 80% and with a mean pore diameter of between 9 and 30 μm.

8. A diesel particle filter obtainable as claimed in claim 1.
9. A diesel particle filter obtainable as claimed in claim 2.
10. A diesel particle filter obtainable as claimed in claim 3.
11. A diesel particle filter obtainable as claimed in claim 4.
12. A diesel particle filter obtainable as claimed in claim 5.
13. A diesel particle filter obtainable as claimed in claim 6.
14. A diesel particle filter obtainable as claimed in claim 7.

15. A method for coating a diesel particle filter with a catalytically active coating, wherein
    the diesel particle filter is vertically oriented so that an inlet end of the filter body faces downward;
    a first, zeolite-free coating suspension of a noble metal catalyst is pumped in through the downward facing inlet end of the filter body up to a predetermined height, to thereby introduce the zeolite-free coating suspension into pores of the filter body;
    the first, zeolite-free coating suspension is suction extracted or pumped downward through the filter body inlet end;
    the diesel particle filter is rotated 180°, such that an outlet end of the filter body faces downward;
    a second, zeolite-containing coating suspension is pumped in through the downward facing outlet end of the filter body up to the upward facing inlet end of the filter body, to thereby uniformly cover the entire length of the filter body;
    the second, zeolite-containing coating suspension is suction extracted or pumped downward through the filter body outlet end; and
    the filter body coating is dried and calcinated, wherein
    prior to coating, both the first and second coating suspensions are ground so finely that the particles of the solids have a diameter $d_{90}$ lower than 5μm and a solid content of less than 25% by weight.

16. The method as claimed in claim 1, characterized in that, upon withdrawing the coating suspensions from the filter body, the catalyst materials are deposited substantially exclusively in the pores of the filter body.

17. The method as claimed in claim 15, characterized in that, upon withdrawing the coating suspensions from the filter body, the catalyst materials are deposited substantially exclusively in the pores of the filter body.

\* \* \* \* \*